US006872463B2

(12) United States Patent
Passone

(10) Patent No.: US 6,872,463 B2
(45) Date of Patent: Mar. 29, 2005

(54) REINFORCING ROD FOR BODY AND/OR CHASSIS ELEMENTS FOR A MOTOR VEHICLE

(76) Inventor: Pietro Passone, Viale Bruno Buozzi 7, I-10048 Vinovo (Torino) (IT)

(*) Notice: Subject to any disclaimer, the term of this patent is extended or adjusted under 35 U.S.C. 154(b) by 0 days.

(21) Appl. No.: 10/296,988

(22) PCT Filed: Nov. 30, 2000

(86) PCT No.: PCT/IB00/01772

§ 371 (c)(1),
(2), (4) Date: Apr. 17, 2003

(87) PCT Pub. No.: WO01/92042

PCT Pub. Date: Dec. 6, 2001

(65) Prior Publication Data

US 2004/0213931 A1 Oct. 28, 2004

(30) Foreign Application Priority Data

Jun. 2, 2000 (IT) .................................... TO2000A0517
Jul. 14, 2000 (IT) .................................... TO2000A0704

(51) Int. Cl.[7] .................................................. B32B 1/08

(52) U.S. Cl. ......................... 428/544; 74/588; 138/156; 138/170; 138/171; 138/178; 428/577; 428/583; 428/586; 428/34.1

(58) Field of Search ................................ 428/544, 577, 428/583, 586, 34.1; 74/588; 138/156, 170, 171, 178

(56) References Cited

U.S. PATENT DOCUMENTS 5,255,487 A 10/1993 Wieting et al.
5,926,930 A * 7/1999 Tamura et al. ............. 29/33 D

FOREIGN PATENT DOCUMENTS

| | | | |
|---|---|---|---|
| DE | 43 28 441 | A | 3/1995 |
| EP | 0 882 640 | A | 12/1998 |
| JP | 04 260 815 | A | 9/1992 |

* cited by examiner

*Primary Examiner*—Robert R. Koehler
(74) *Attorney, Agent, or Firm*—Sughrue Mion, PLLC

(57) ABSTRACT

A reinforcing bar for body and/or chassis parts of a motor vehicle includes a one-piece element (8) extending from one end of the bar to the other and having a median portion (10) with closed tubular cross-section and at least one end portion (12) comprising an open-section distal portion (14) and a proximal portion (16) which connects the said distal portion (14) to the median portion (10).

5 Claims, 5 Drawing Sheets

REINFORCING ROD FOR BODY AND/OR CHASSIS ELEMENTS FOR A MOTOR VEHICLE

This is a National Stage entry under 35 U.S.C. § 371 of application Ser. No. PCT/1B00/01772 filed Nov. 30, 200, and the complete disclosure of which is incorporated into this application by reference.

BACKGROUND OF THE INVENTION

The present invention relates to a reinforcing bar for a body and/or chassis part of a motor vehicle, for example an anti-intrusion bar for a door, an energy-absorbing cross member or the like.

More particularly, such a bar includes a median portion, for providing the required mechanical strength, and end portions for fitting it to adjacent body and/or chassis parts of the motor vehicle.

SUMMARY OF THE INVENTION

The object of the present invention is to provide a reinforcing bar which is simple to produce but able to ensure the aforesaid properties of mechanical strength and connectability to other components of the motor vehicle.

This object is achieved by providing a reinforcing bar which includes a one-piece structure extending from one end of the bar to the other and having a median portion with a closed tubular cross section and at least one end portion comprising a distal portion with an open section and a proximal portion connecting the said distal portion to the median portion.

In the description which follows, the expression "closed tubular cross section" should be understood to include both structures which are effectively closed and tubular structures which are open along a generatrix, with the edges simply adjacent or possibly joined at longitudinally spaced points.

In addition, this expression also refers to structures which are closed owing to the presence of one or more additional elements, which increase the rigidity of the aforesaid one-piece element.

BRIEF DESCRIPTION OF THE DRAWINGS

Further characteristics and advantages of the present invention will become apparent from the detailed description which follows, provided purely by way of non-limitative example, with reference to the appended drawings, in which.

DETAILED DESCRIPTION OF THE INVENTION

Figure 1:
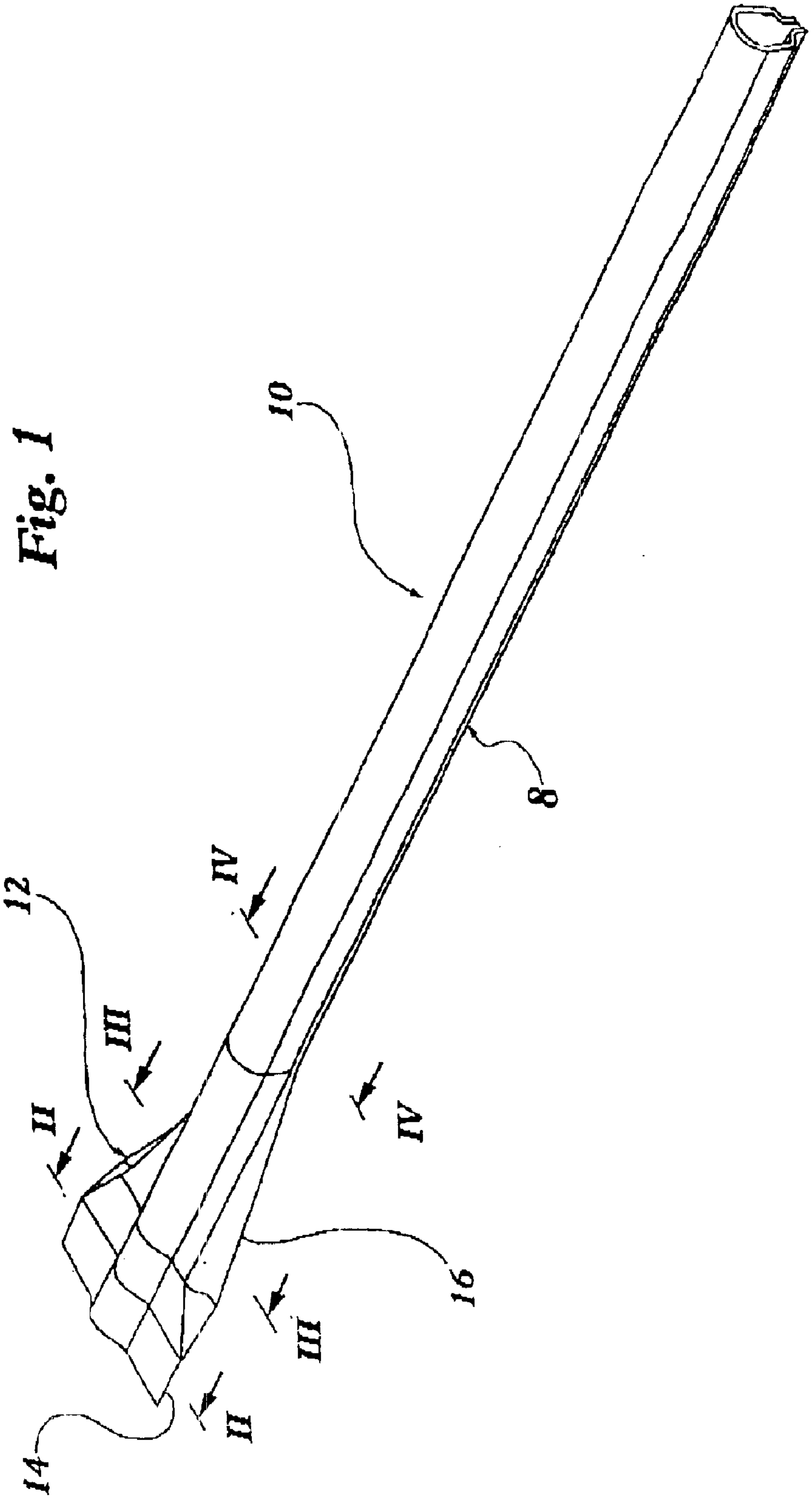
FIG. 1 is a perspective view of a bar of the invention.
Figure 2:
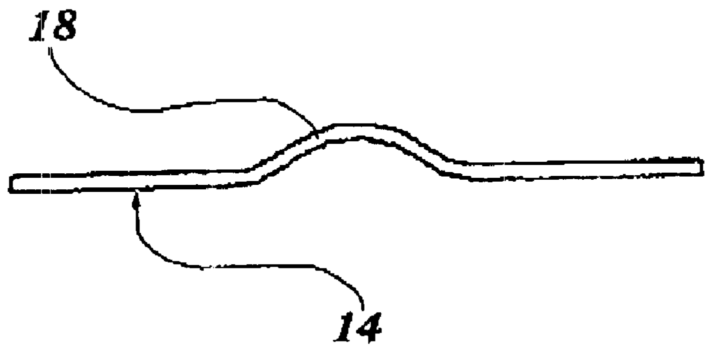
FIGS. 2 to 4 are sections taken on the lines II—II, III—III and IV—IV respectively of FIG. 1.
Figure 3:
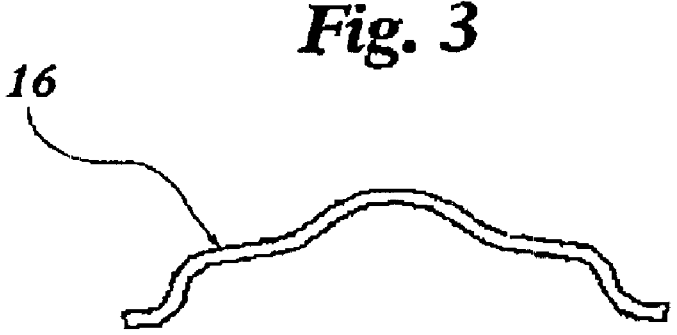
Figure 4:
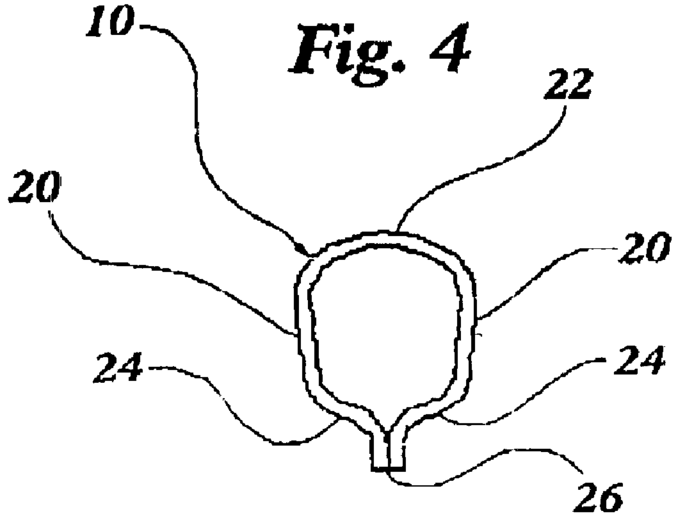

A reinforcing bar for body and/or chassis parts of a motor vehicle includes (FIGS. 1–4) a one-piece structure 8 extending from one end of the bar to the other and including a median portion 10 and end portions 12. For the sake of simplicity, FIG. 1 shows only one of these and portions 12, the characteristics thereof being equivalent to those of the end not shown.

The median portion 10 has a closed tubular cross section, while each end portion 12 includes a distal portion 14 with an open cross section and an extent transverse the longitudinal axis of the bar greater than that of the cross section of the median portion 10, and a proximal portion 16, joining the distal portion 14 to the median portion 10.

Lengthwise, this latter is rectilinear but, in alternative embodiments of the invention, not illustrated, it could be curved in one or more dimensions.

The cross section (FIG. 2) of the distal portion 14 is substantially flat with a central projection 18 in the shape of a segment of a circle, thereby making the bar easy to fit, by welding for example, to adjacent parts of the body and/or chassis. In alternative embodiments of the invention, not illustrated, the extent of the distal portion 14 transverse the longitudinal axis of the bar could be equal to or less than that of the cross section of the median portion 10.

The cross section (see FIG. 3) of the proximal portion 16 of the element 8 preferably varies gradually from the open section of the distal portion 14 to the closed section of the median portion 10.

This latter (see FIG. 4) has two converging straight sides 20 joined at the top by a curved portion 22 and at the bottom by two ends 24 with facing surfaces 26 thereby ensuring that the bar has the required mechanical strength.

In other embodiments of the invention not illustrated, the various portions of the bar could differ from those described, adapting thereby to specific functional requirements while still providing the necessary properties of simple fitting and mechanical strength. For example, the closed tubular section of the median portion 10 could, in principle, be of any shape instead of the illustrated, that is circular, square, polygonal and the like. In addition, the shape and/or the orientation in space of the closed tubular section could vary along the length of the median portion 10, in principle even from one point to another. It is thus possible to give the bar optimal geometric characteristics, thereby giving it advantageous properties in terms of the precise variability of the moment of inertia, mechanical strength, weight reduction and the like, with a view to specific functional requirements.

The bar as described can be manufactured from a flat steel sheet, for example, and than formed, in accordance with the above description, along various portions of tis length. In particular, the sheet could be folded into a closed tubular structure at the median portion 10 with the facing edges 26 being welded together, either by spots or by a continuous longitudinal seam.

The material used for the bar is not critical in the context of the invention and could, in principle, be any material, that is a metal, a plastic material or a composite, provided it can be formed into the required shape.

Figure 5:
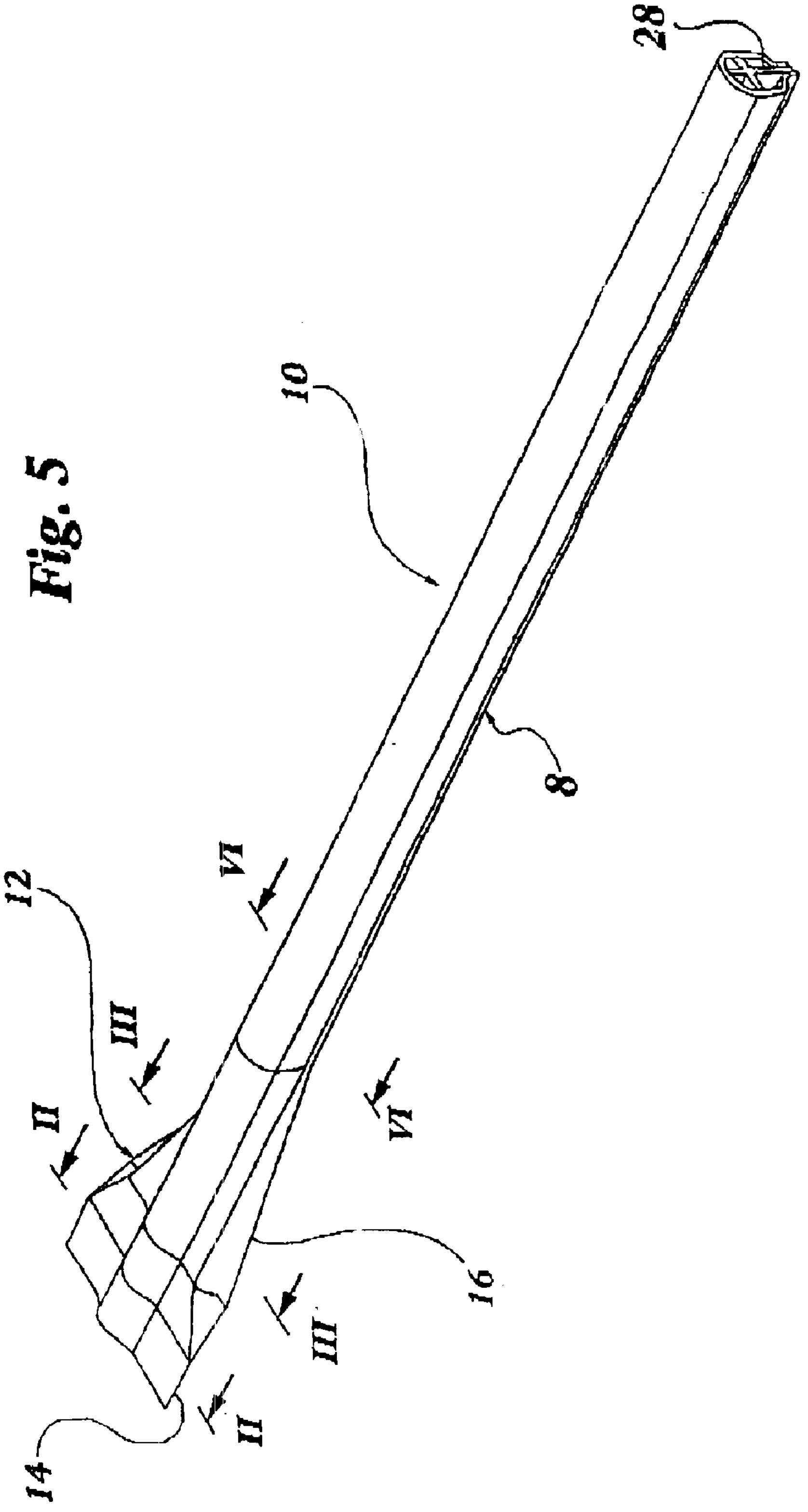
FIG. 5 is a perspective view of a variant of a bar of the invention, with an internal element for increased rigidity.
Figure 6:
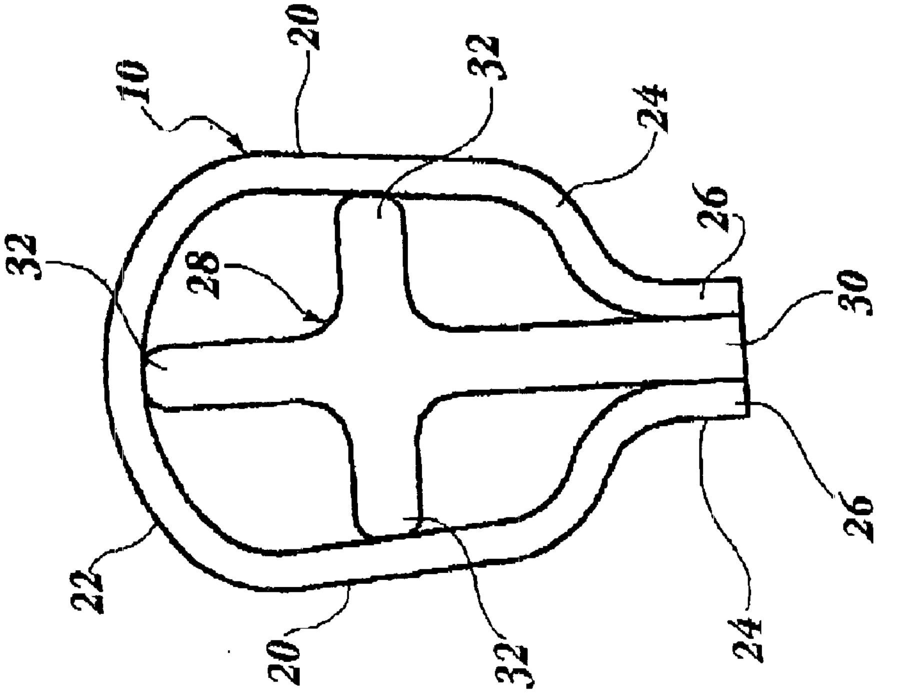
FIG. 6 is a section taken on the line VI—VI of FIG. 5.

FIGS. 5 and 6, in which the same numbers used in FIGS. 1 to 4 refer to identical or equivalent parts, illustrate a variant of the bar of the invention.

In this case, a stiffening element 28, with a cruciform section, is inserted into the median portion 10 of the element 8, with the lower arm 30 of the cross fixed, for example by welding, to the facing edges 26 of the median portion of the element 8, between which it is inserted. The arm 30 thus closes the cross section of the median portion 10. The distal ends of the remaining arms 32 of the cruciform member brace respective portions of the internal surface of the portion 10 with which they are in contact.

The element 28 thus reinforces the structure of the element 8, providing the bar with the required mechanical strength.

The length and position of the element 28 can vary in dependence on the requirements to be met. It can extend for the entire length of the median portion or for a fraction thereof, in any position. Alternatively, there could be several separate elements 28, provided to strengthen specific portions of the element 8. As an alternative, or in addition to the above, one or more elements 28 could be arranged at the site of at least one of the end portions 12.

The cross section of the element or elements 28 can vary from that shown in FIG. 6 substantially without limitation, other than those imposed by the need to make the bar sufficiently rigid.

Figure 7:
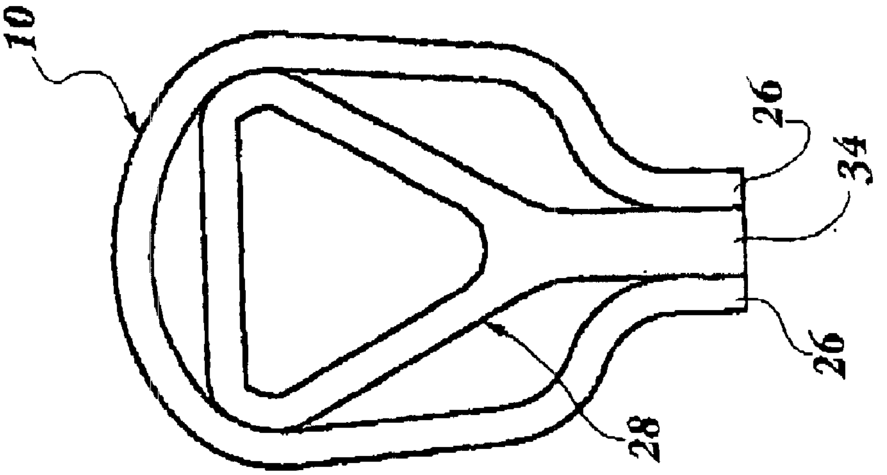
FIG. 7 is a view corresponding to that of FIG. 6 but illustrating a variant of an internal element for increased rigidity.

To this end, FIG. 7 shows a further example of cross section for a stiffening element 28, that is a hollow triangle with an appendage 34 welded to the facing edges 26 of the median portion 10 of the element 8 between which it is inserted.

Figure 10:
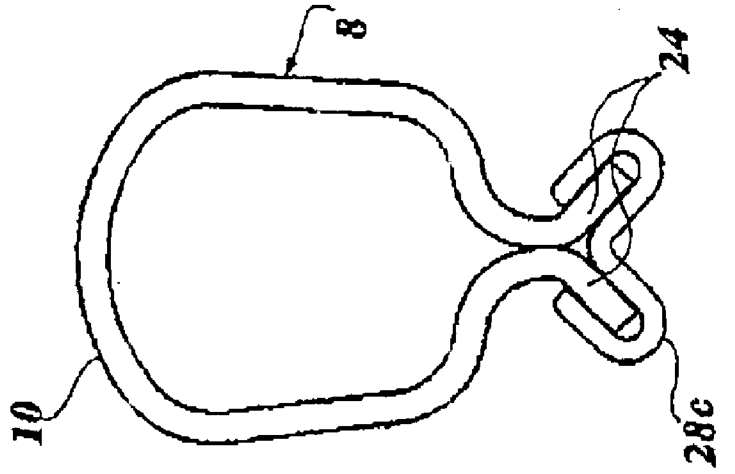
FIGS. 8 to 10 are views corresponding to that of FIG. 4 illustrating respective variants of a bar of the invention, each with an external stiffening element.
Figure 9:
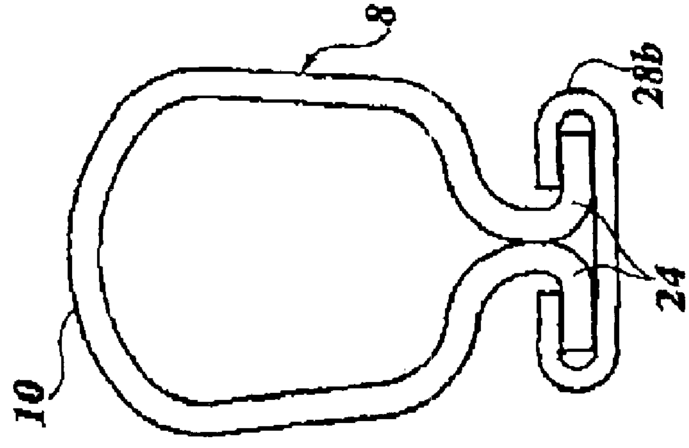
Figure 8:
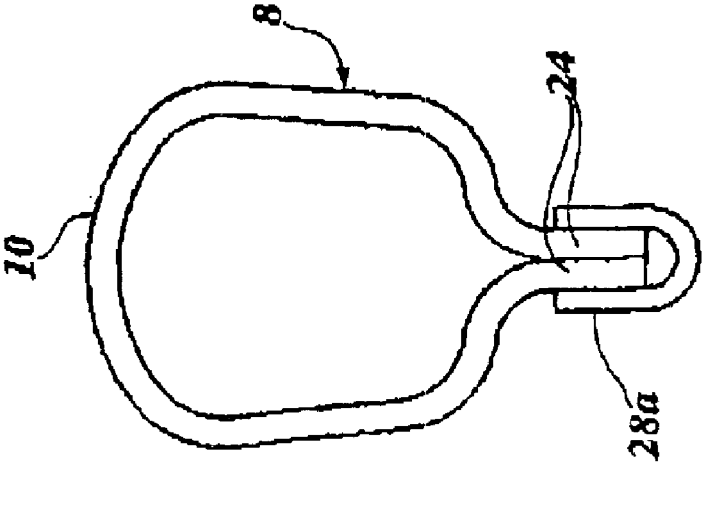

FIGS. 8 to 10, in which the reference numerals used in earlier drawings indicate identical or equivalent parts, illustrate additional embodiments of the invention provided with a stiffening element arranged externally of the median portion 10 of the element 8.

In the bar of FIG. 8, the stiffening element 28*a* has a U-shape section and encloses the adjacent ends 24.

In the bar of FIG. 9, the stiffening element 28*b* has a horizontal C-shape section enclosing the horizontally spread ends 24.

In the bar of FIG. 10, the stiffening element 28*c* has a W-shape section enclosing the partially spread ends 24.

The stiffening elements 28*a–c* can be used instead of or in addition to the stiffening elements 28 arranged inside the median portion 10 of the element 8.

The length and position of the elements 28*a–c* may be varied in dependence on the requirements to be satisfied. They may thus extend the entire length of the median portion, or for a fraction thereof and in any position. Alternatively, there could be several separate elements 28*a–c*, provided to stiffen specific portions of the element 8.

The elements 28*a–c* can be fitted to the element 8 by means of any known method, for example by welding, clinching, punching or any combination thereof. The cross section of the elements 28*a–c* could of course also vary with respect to those illustrated in FIGS. 8–10 substantially without limit, except for those imposed by the need to give the bar the required stiffness.

Naturally, the principle of the invention remaining the same, manufacturing details and embodiments may vary widely from those described purely by way of example, without departing thereby from the scope of the invention. In particular, in dependence on particular conditions of use, the bar could include a one-piece structure with a single end portion including a distal portion with an open cross section and a proximal portion connecting the distal portion to the median portion, having a section like those described above.

What is claimed is:

1. A reinforcing bar for body and/or chassis parts of a motor vehicle, comprising:

a one-piece element (8) extending from one end of the bar to the other and having a median portion (1) with a closed tubular section and at least one end portion (12) which includes an open-section distal portion (14) and a proximal portion (16) which connects the distal portion (14) to the median portion (10);

at least one stiffening element for stiffening the one-piece element (8), wherein said at least one stiffening element is arranged externally of the median portion (10) of the element (8) and wherein the closed tubular section of the median portion (10) is obtained by folding a steel sheet, the edges (24) of which are enclosed by said at least stiffening element.

2. A bar according to claim 1, wherein each of the end portions (12) includes an open-section distal portion (14), the extent of which, transverse the longitudinal axis of the bar, is greater than that of the cross section of the median portion (10), and a proximal portion (16) connecting the said distal portion (14) to the median portion (10).

3. A bar according to claim 1, wherein the cross section of said proximal portion (16) varies gradually from the open section of the distal portion (14) to the closed section of the median portion (10).

4. A bar according to claim 1, wherein the extent of said distal portion (14) transverse the longitudinal axis of the bar is greater that that of the cross section of the median portion (10).

5. A bar according to claim 1, wherein said at least one stiffening element (28, 28*a–c*) is fixed to the element (8).

* * * * *